(No Model.)

J. A. TEMPLE.
NUT LOCK.

No. 596,094. Patented Dec. 28, 1897.

Witnesses

Inventor
John A. Temple
by Geo. H. Holgate
Attorney

UNITED STATES PATENT OFFICE.

JOHN A. TEMPLE, OF SHAMOKIN, PENNSYLVANIA, ASSIGNOR OF ONE-HALF TO WILLIAM A. ZIEGLER, OF MILTON, PENNSYLVANIA.

NUT-LOCK.

SPECIFICATION forming part of Letters Patent No. 596,094, dated December 28, 1897.

Application filed March 1, 1897. Serial No. 625,441. (No model.)

*To all whom it may concern:*

Be it known that I, JOHN A. TEMPLE, a citizen of the United States, residing at Shamokin, in the county of Northumberland and State of Pennsylvania, have invented a new and useful Improvement in Nut-Locks, of which the following is a full, clear, and exact specification.

My invention relates to a new and useful improvement in nut-locks, and has for its object to provide a simple, cheap, and effective arrangement by means of which a nut may be locked upon its bolt, so as to prevent a retrograde movement independent of the surfaces against which said nut may bear, and which by its peculiar arrangement will permit of the nut being automatically unlocked when it is desired to either further tighten it upon its bolt or remove it therefrom.

With these ends in view this invention consists in the details of construction and combination of elements hereinafter set forth, and then specifically designated by the claim.

In order that those skilled in the art to which this invention appertains may understand how to make and use the same, the construction and operation will now be described in detail, referring to the accompanying drawings, forming a part of this specification, in which—

Figure 1:
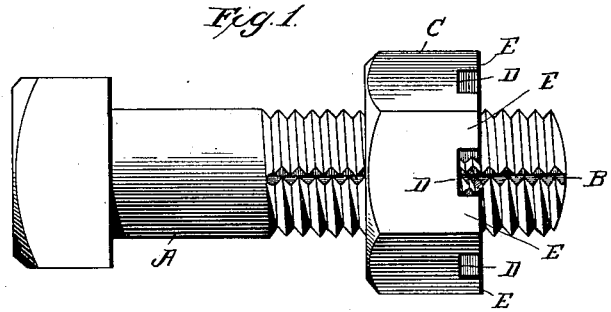
Figure 2:
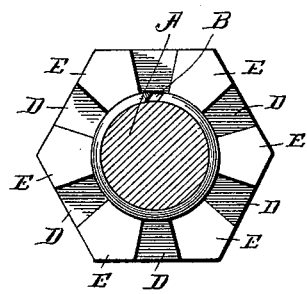

Figure 1 represents a bolt having a nut locked thereon in accordance with my improvement; Fig. 2, an end view of the same, and Fig. 3 a perspective of an implement especially adapted for locking the nut.

In carrying out my invention as here embodied, A represents the bolt provided with the usual threads and having a slot B formed through the threaded portion thereof to a depth equal to or somewhat greater than the depth of the threads, and it is preferable that this slot be cut at an angle to a radius of the bolt, so as to cause one edge of the threads to overhang in a direction following the direction of the threads, for the purpose hereinafter set forth.

The nut C may be of any well-known form and has cut in its outer face a series of notches or channels D, thereby leaving projections E, extending outward, in which are sections of the thread originally formed in the nut.

From this description the operation of my improvement will be obviously as follows: When a nut is jammed against the object which it is to hold, the operator, with the use of a wrench, backs off the nut far enough to have the first or nearest groove coincide to the groove in the bolt. Then by the application of a chisel or other suitable implement to the first intersecting thread or the one nearest the body of the nut and a slight blow upon said chisel with a hammer the thread will be forced in toward the nut directly opposing the intersecting thread in the projection of the nut relative to its own position, thereby rendering it securely locked by a single thread. When it is necessary to remove the nut, the operator applies his wrench and under a strong pressure in the direction for further tightening the nut said nut forces the bent thread on the bolt into its original position, after which the operator may remove the nut with ease without impairing the bolt or nut. As the distance the nut must travel forward to unlock is only the width of one projection or a small part of the revolution, it will readily yield under the wrench; but should some unskilful person jam the nut on so tight as not to admit of further movement onward the operator must bend the locking-thread on the bolt back into its original position with the chisel or other suitable instrument, when the nut may be removed in the usual manner. After one nut makes one rotation backward the locking-thread on the bolt enters the continuous thread in the nut, or, if convenient, the bolt may be turned toward the right instead of the nut while the latter is held with a suitable wrench, thus bringing about the same result.

Each nut can be locked by one or more threads, if so required, by either making the notches deeper or forming more than one groove in the bolt.

While my improvement is not self-locking, it is an automatic unlocker.

It is obvious that instead of bending one of the threads downward a suitable implement may be inserted within the slot in the bolt and the projecting ends of the threads thereof forced outward, which will accomplish the same result.

Figure 3:
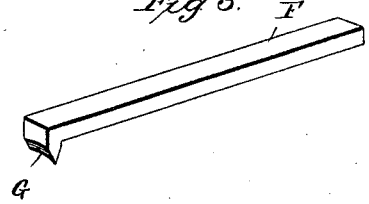

In Fig. 3 a suitable implement is shown for locking or unlocking the nut, and it consists of a chisel having a shank F and an offset nose G, with sufficient curve therein to fit the outline of the bolt.

The cost of nuts and bolts made in accordance with my improvement will be but little in advance of those of ordinary construction, while having the additional feature of a perfect lock, and it is obvious that the nuts may be either forged or cast, and when the latter their cost will not be increased over the usual forms.

Having thus fully described my invention, what I claim as new and useful is—

In combination a bolt having threads formed thereon, said threads being intersected by a slot cut at an angle to the diameter of the bolt and forming teeth of the threads adapted to be bent out of position, a nut run upon said thread, projections formed on the nut, said projections having sections of the thread that is formed in the nut formed on their inner faces to engage the teeth when bent out of position, substantially as described.

In testimony whereof I have hereunto affixed my signature in the presence of two subscribing witnesses.

JOHN A. TEMPLE.

Witnesses:
S. S. WILLIAMSON,
R. M. PIERCE.